(No Model.)

C. HERMANN.
RATCHET TOOL HANDLE.

No. 304,102.   Patented Aug. 26, 1884.

WITNESSES:
Donn Twitchell
C. Sedgwick

INVENTOR:
C. Hermann
BY Munn & Co
ATTORNEYS.

UNITED STATES PATENT OFFICE.

CHRISTIAN HERMANN, OF BRISTOL, RHODE ISLAND.

RATCHET TOOL-HANDLE.

SPECIFICATION forming part of Letters Patent No. 304,102, dated August 26, 1884.

Application filed June 3, 1884. (No model.)

*To all whom it may concern:*

Be it known that I, CHRISTIAN HERMANN, of Bristol, in the county of Bristol and State of Rhode Island, have invented a new and Improved Ratchet Tool-Handle, of which the following is a full, clear, and exact description.

The object of my invention is to provide a ratchet-handle that can be readily applied to and used with auger-bits, gimlets, screw-drivers, and tools of that class generally; and it consists of the combination of parts and their construction, substantially as hereinafter described and claimed.

Reference is to be had to the accompanying drawings, forming part of this specification, in which similar letters of reference indicate corresponding parts in all the figures.

Figure 1:
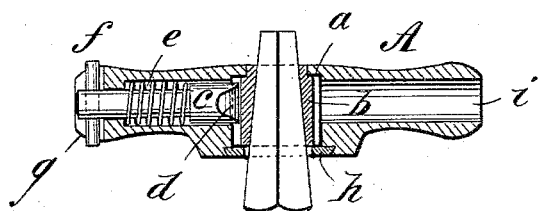
Figure 2:
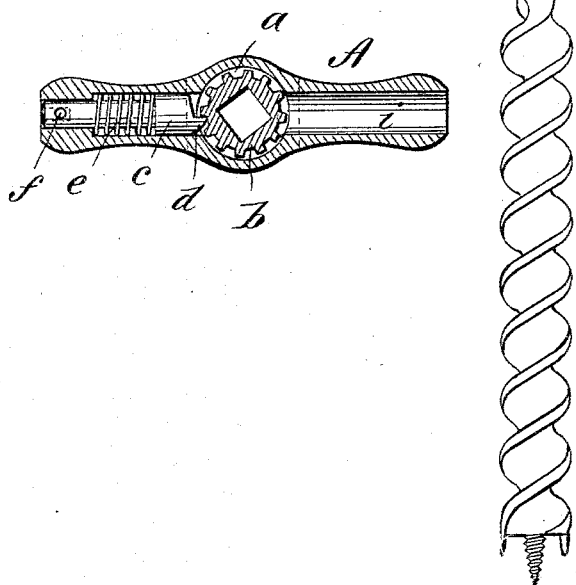
Figure 3:
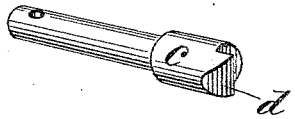

Figure 1 is a sectional side elevation of the handle as applied to a bit. Fig. 2 is a sectional plan view, and Fig. 3 is a detail view.

The handle A is a straight bar of suitable length, formed with a recess or pocket, $a$, at its mid-length, in which is seated a ratchet-sleeve, $b$, having an angular aperture for passing upon the tool-shank. The handle is bored lengthwise through both ends, and in the hole at one end is a sliding pawl or dog, $c$, provided with a lip, $d$, that engages the ratchet-sleeve. The dog is turned down for a portion of its length, and the bore in the handle at one end is made smaller to correspond, so that a space is formed to receive the spiral spring $e$ around the dog and between the two shoulders. The spring thus acts to move the dog inward, the movement being limited by a cross-pin, $f$, through the outer end of dog $c$, and seated in a cross-groove, $g$, in the handle, to prevent the dog from turning accidentally. The teeth of the ratchet-sleeve have sides of equal length, and the lip $d$ of the dog or pawl is at one side of the center line, with its straight face on the same line, so as to abut squarely against the side of the teeth, and thus hold the sleeve firmly against rotation in one direction, either right or left, as the pawl may be turned. The ratchet is held in the recess by a ring-plate, $h$, fitted to the under side of the handle in a manner to allow removal. The hole $i$ in the handle allows insertion of the dog, and can be used to receive a bar to give greater leverage.

The ratchet-handle can be readily applied to bits, screw-drivers, and other tools, and by drawing back the pawl and giving it a half-turn the ratchet mechanism is changed from right to left, so that the handle can be used to withdraw a boring-tool or back out a screw.

I am aware that it is not new, broadly, to employ a reversible tooth or pawl to engage a ratchet upon the tool-spindle, said pawl having a pin moving in a transverse slot of the stock-head, and connected to a notched sleeve or collar arranged upon said head, and with its notches engaged by a stud of said head.

Having thus described my invention, I claim as new and desire to secure by Letters Patent—

1. The two-armed tool-handle, with a central ratchet-sleeve arranged between its arms, one of said arms having a pawl with its shank encircled by a spring, and with one end projecting into a transverse slot at the outer end of said arm, and receiving a pin inserted through said slot, substantially as and for the purpose set forth.

2. The hollow or chambered tool-handle having the ratchet-sleeve, with its axial plane at right angles to the longitudinal plane of the handle, in combination with the spring dog or pawl, with its tooth engaging said ratchet-sleeve and its outer end provided with a transverse pin let into a slot in one end of the handle, said handle also having in one end a chamber or aperture to receive a lever, substantially as and for the purpose set forth.

CHRISTIAN HERMANN.

Witnesses:
EDGAR TATE,
ALFRED H. DAVIS.